3,052,723
PROCESS FOR PREPARING N-CHLOROBIS-(TRIFLUOROMETHYL)AMINE

Charles W. Tullock, Wilmington, Del., assignor to E. I. du Pont de Nemours and Company, Wilmington, Del., a corporation of Delaware
No Drawing. Filed Sept. 29, 1959, Ser. No. 843,048
3 Claims. (Cl. 260—583)

This invention relates to, and has at its principal object provision of, a novel process for the synthesis of N-chlorobis(trifluoromethyl)amine, i.e., $(CF_3)_2NCl$.

N-chlorobis(trifluoromethyl)amine has been shown by qualitative tests and by spectroscopic examination to be formed by the action of phosphorus pentachloride on N,N-bistrifluoromethylhydroxylamine, but it could not be isolated from the reaction mixture because of reaction with by-product hydrogen chloride to give bis(trifluoromethyl)amine and free chlorine. N-chlorobis(trifluoromethyl)amine has also been prepared, though not in good yield, by the action of chlorine on di[bis(trifluoromethyl)amino]mercury, $(CF_3)_2NHgN(CF_3)_2$. These processes are not only technically unsatisfactory but require costly and not readily available intermediates. Past attempts to prepare N-chlorobis(trifluoromethyl)amine from the much more accessible bis(trifluoromethyl)amine have been unsuccessful.

It has now been found that N-chlorobis(trifluoromethyl)amine can be prepared in high yield by reacting chlorine with bis(trifluoromethyl)amine under essentially anhydrous conditions in the presence of a hydrogen chloride acceptor that is non-reactive to $(CF_3)_2NH$. Such acceptors are neutral or acidic salts which have affinity for hydrogen chloride, e.g., the alkali metal fluorides. Potassium fluoride is a good and preferred example. It removes hydrogen chloride from the reaction zone thus:

$$2KF + HCl \rightarrow KCl + KHF_2$$

Bis(trifluoromethyl)amine, the raw material for this process, is synthesized from hydrogen fluoride and perfluoroazapropene as described by Young et al., J. Am. Chem. Soc. 80, 3604 (1958) and Haszeldine, J. Chem. Soc. 1955, 2353, or from the reaction of cyanogen iodide with iodine pentafluoride as described by Ruff et al., Ber. 73, 724 (1940).

A convenient way to carry out the instant process is to place bis(trifluoromethyl)amine, chlorine and a hydrogen chloride acceptor in a noncorrosive pressure reactor under essentially anhydrous conditions followed by heating at 150–400° C. with agitation under autogenous pressure until reaction has taken place. The reactor is then allowed to cool to room temperature and the volatile products, including the desired N-chlorobis(trifluoromethyl)amine, are allowed to distill into an evacuated receiver cooled to about −190° C. Unchanged chlorine contained in the volatile products can be removed from the N-chlorobis(trifluoromethyl)amine by storing the mixture over sulfur at room temperature under autogenous pressure for 2 hours or more. The N-chlorobis(trifluoromethyl)amine thus produced can be used without further purification, or it can be purified by distillation or other methods.

There are no sharply critical process variables in the invention. Temperature, for example, can vary considerably depending upon the hydrogen chloride absorbent and pressure used but will usually fall within the range of 150–400° C. In practice, the heating of the reactants is generally conducted by a stepwise procedure wherein they are maintained for short periods of time at progressively higher temperatures. This procedure permits smooth operation of the process and avoids sudden increases in pressure in the reaction vessel. Such procedure is, however, not essential for operability and the reactants can, if desired, be heated in one step to the reaction temperature.

In a closed, batch-type reactor of the type described above the pressure will, of course, be autogenous and superatmospheric. The process can, however, be carried out continuously in other types of apparatus, e.g., by passage of the reactants through a hot tube packed with hydrogen chloride absorbent. Here the pressure can be atmospheric or even subatmospheric.

As noted above, potassium fluoride is the preferred hydrogen chloride absorbent, but fluorides of the alkali metals of atomic numbers 11 through 55 may be used.

The relative quantities of reactants employed, i.e., the molar ratio of chlorine to bis(trifluoromethyl)amine, may vary greatly. Ratios around stoichiometric will generally be used, but solely to avoid waste of either reactant. A considerable excess of the hydrogen chloride absorbent is usually employed.

Here follow some examples which are intended to more fully illustrate, but not to limit, the process of this invention.

Example I

A mixture of 27 g. of bis(trifluoromethyl)amine, $[(CF_3)_2NH]$, 13 g. of chlorine and 90 g. of anhydrous potassium fluoride was heated with agitation in the absence of air in a 500-ml. bomb lined with a chemically-resistant alloy of nickel, iron and molybdenum ("Hastelloy" C) at 100° C. for 1 hour, at 200° C. for 1 hour, at 250° C. for 1 hour, and at 325° C. for 1 hour. The bomb was allowed to cool to room temperature and it was then connected, through appropriate piping, to a 300-ml. stainless steel cylinder, which was evacuated and cooled in liquid nitrogen. The volatile products were then allowed to distill from the bomb into the cylinder. The distillate was a very pale yellow color and gave two cuts upon fractional distillation: (a) 6 g., B.P. −24° C. to −15° C., and (b) 21 g., B.P. −9° C. to −3° C. Infrared analysis showed that the second fraction was chiefly N-chlorobis(trifluoromethyl)amine, $[(CF_3)_2NCl]$, showing spectral lines identical with those reported in the literature (Young et al., loc. cit.) for $(CF_3)_2NCl$. Nuclear magnetic resonance analysis showed one fluorine resonance, which is also consistent with the $(CF_3)_2NCl$ structure. These results indicated that a 63% conversion of $(CF_3)_2NH$ to $(CF_3)_2NCl$ had resulted.

The 6 g. fraction, distilling at −24° C. to −15° C., was stored over sulfur to remove chlorine by conversion to sulfur monochloride. This treatment absorbed 5 g. of the product, showing that this fraction was chiefly chlorine.

Example II (A) A mixture of 46 g. of bis(trifluoromethyl)amine, 28 g. of chlorine and 100 g. of anhydrous potassium fluoride was heated in the equipment described in Example I at 200° C. for one hour, at 250° C. for one hour, and at 325° C. for one hour. After cooling to room temperature, the volatile products (amounting to 65 g.) were removed from the reaction vessel as described in Example 1 and stored over 50 g. of sulfur at room temperature and autogenous pressure for one day to remove unreacted chlorine. The product not absorbed by the sulfur was combined with the product similarly prepared from 40 g. of bis(trifluoromethyl)amine, 28 g. of chlorine and 100 g. of potassium fluoride. Distillation of the combined products gave 100 g. of N-chlorobis(trifluoromethyl)amine, B.P. −5° C. to −2° C. (chiefly at −2° C.), indicating that an 85% conversion of $(CF_3)_2NH$ to $(CF_3)_2NCl$ had taken place.

(B) In another example, bis(trifluoromethyl)amine was treated with chlorine as above indicated except with heating solely at 325° C. for one hour. Essentially the same amount of N-chlorobis(trifluoromethyl)amine was formed.

*Example III*

A mixture of 20 g. of bis(trifluoromethyl)amine, 10 g. of chlorine and 40 g. of sodium fluoride was heated in the apparatus described in Example I at 250° C. for one hour, and at 325° C. for four hours. The volatile products removed from the bomb as described in Example I weighed 25 g. Fractional distillation of this product yielded 13 g. of a fraction, B.P. −22° C. to −6° C. which infrared analysis showed contained $(CF_3)_2NCl$ with varying amounts of $(CF_3)_2NH$, $CF_3N=CF_2$, and $CF_3NCO$.

N-chlorobis(trifluoromethyl)amine is a very reactive chemical useful as an intermediate in the preparation of other fluorochemicals. For instance, N-chlorobis(trifluoromethyl)amine can be used for the preparation of valuable fluorocarbons such as tetrafluoroethylene by pyrolysis in the presence of carbon according to the process of U.S. Patent 2,894,996.

As further evidence of the high reactivity of N-chlorobis(trifluoromethyl)amine, the following newly-discovered reaction is cited: A 300 ml. pressure reactor lined with a chemically resistant alloy of nickel, iron and molybdenum ("Hastelloy" C) was freed of air and charged with 20 g. of N-chlorobis(trifluoromethyl)amine. The bomb was agitated, heated gradually, and sufficient carbon monoxide was injected to give a total internal pressure of 400 lb./sq. in. when the temperature reached 100° C. The bomb was heated at 100° C. for 1 hour, at 200° C. for 1 hour and at 250° C. for 1 hour. The pressure at this time was 350 lb./sq. in. The bomb was cooled to 25° C. and the gases were bled slowly through a receiver cooled with solid carbon dioxide in acetone. A condensate in the cold trap weighing 3 g. left, on re-evaporation, 1 g. of a non-volatile at room temperature liquid. This was combined with the non-volatile fraction remaining in the reactor to give 12 g. of a liquid, B.P. 38.5° C. which was shown by infrared and nuclear magnetic resonance analysis to be identical with known bis(trifluoromethyl)carbamyl chloride (Young and Dresdner, J. Org. Chem. 23, 1576 (1958).

Bis(trifluoromethyl)carbamyl chloride can be converted into urethanes by reaction with alcohols and into ureas by reaction with amines. The urethane produced by the reaction of said carbamyl chloride with stearyl alcohol can be used as a water-proofing agent.

Since obvious modifications and equivalents in the invention will be evident to those skilled in the chemical arts, I propose to be bound solely by the appended claims.

The embodiments of the invention in which an exclusive property or privilege is claimed are defined as follows:

1. A process of preparing N-chlorobis(trifluoromethyl)amine which comprises heating chlorine and bis(trifluoromethyl)amine to a temperature of about 150° to about 400° C., under essentially anhydrous conditions, in the presence of a fluoride of an alkali metal of atomic number 11 through 55.

2. The process of claim 1 wherein the hydrogen chloride acceptor is potassium fluoride.

3. The process of claim 1 wherein the hydrogen chloride acceptor is sodium fluoride.

References Cited in the file of this patent

UNITED STATES PATENTS 2,808,439     Barrett et al. _____ Oct. 1, 1957

OTHER REFERENCES

Haszeldine et al.: Chem. and Ind., vol. 1956, pages 81–2 (1956).

Haszeldine et al.: J. Chem. Soc., vol. 1957, pages 1741–5 (1957).

Young et al.: J.A.C.S., vol. 80, pages 3604–6 (1958).